April 15, 1958 J. KREBS, JR., ET AL 2,830,323
TURRET-TYPE MOLDING PRESSES
Filed Nov. 17, 1955 3 Sheets-Sheet 2
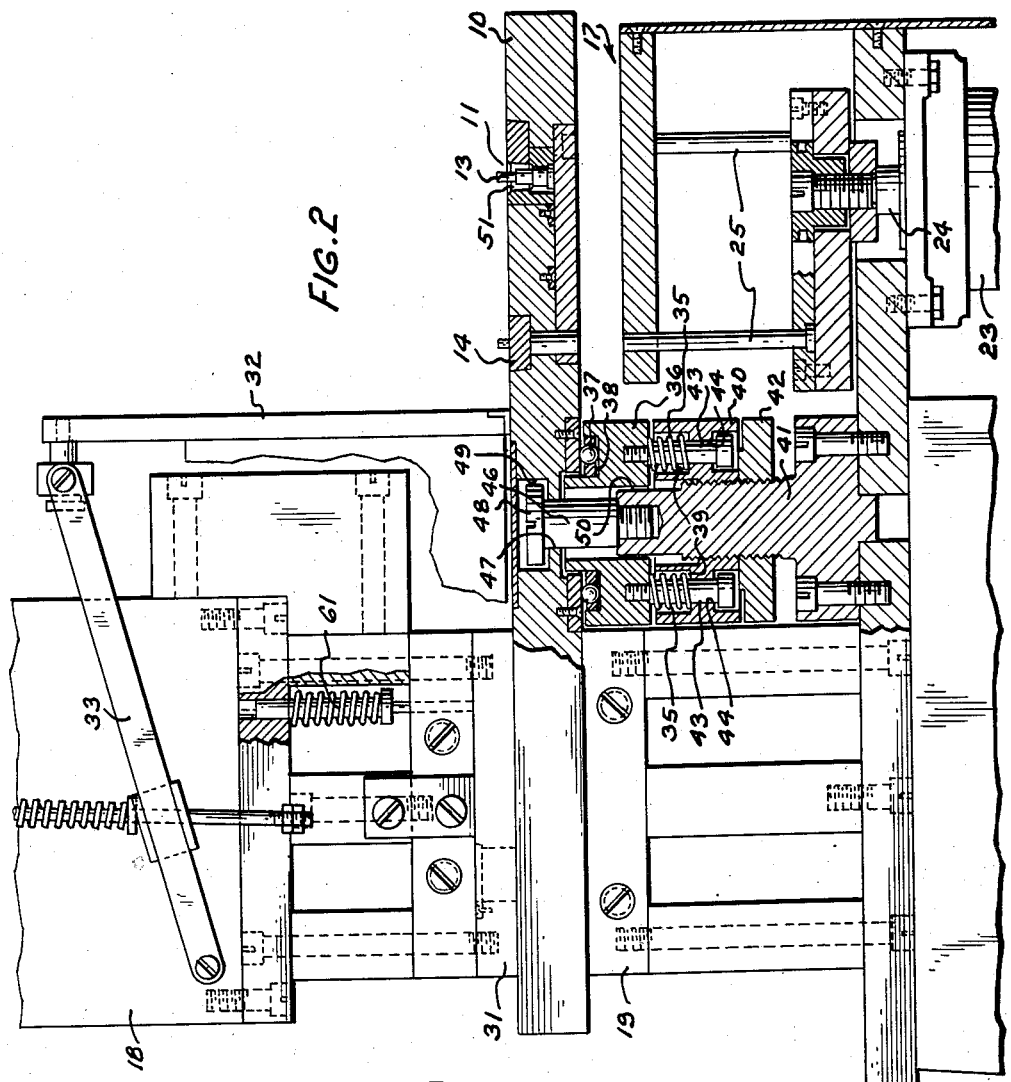
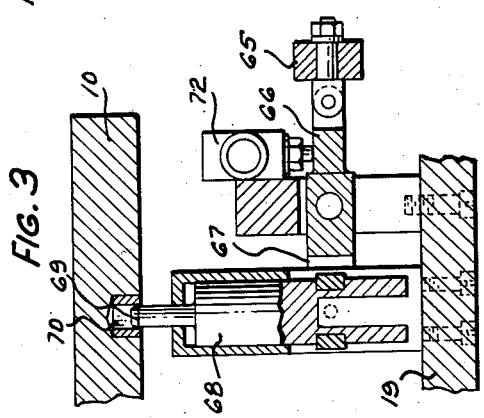
INVENTORS
J. KREBS, JR.
D. C. MORRIS
BY J. R. Hall
ATTORNEY

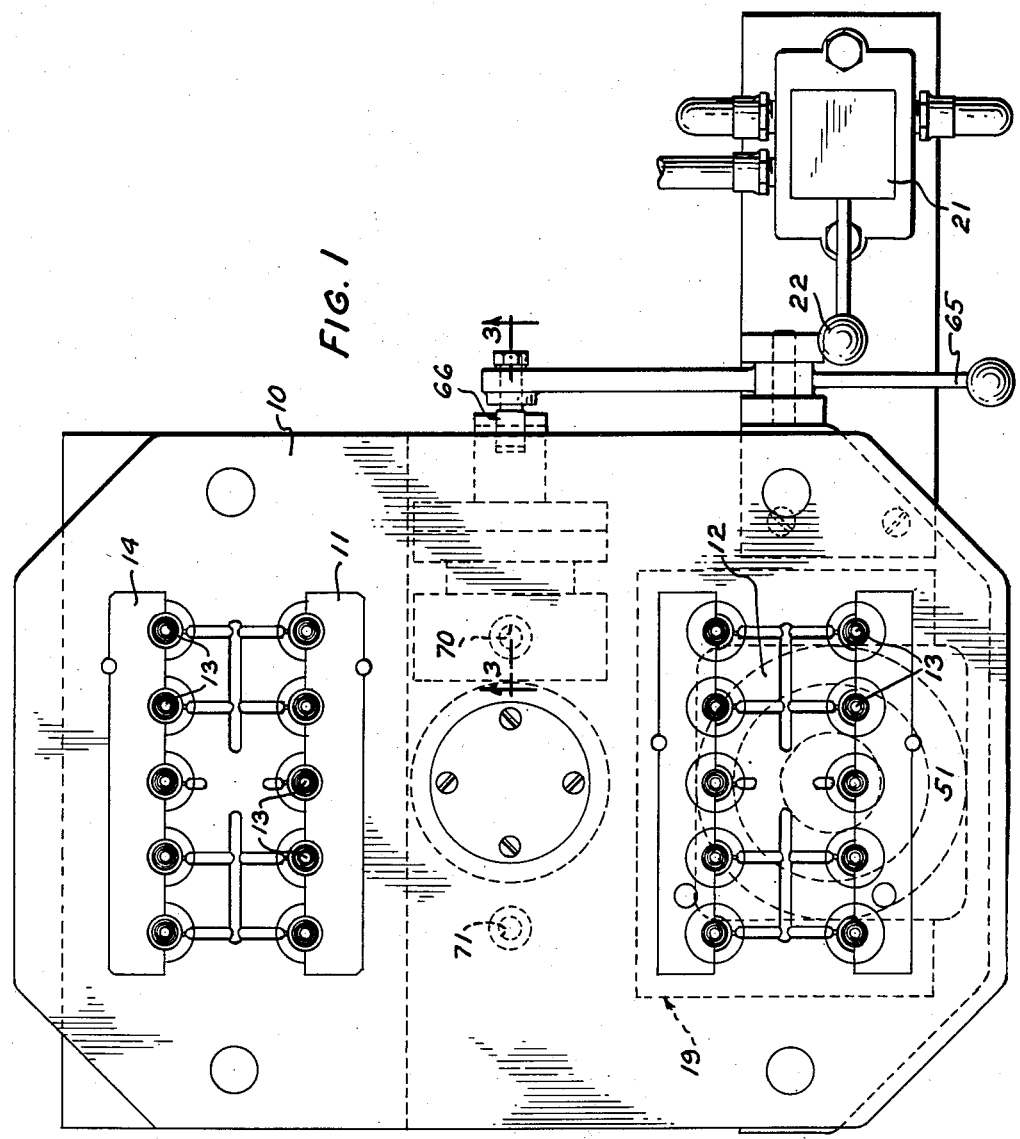

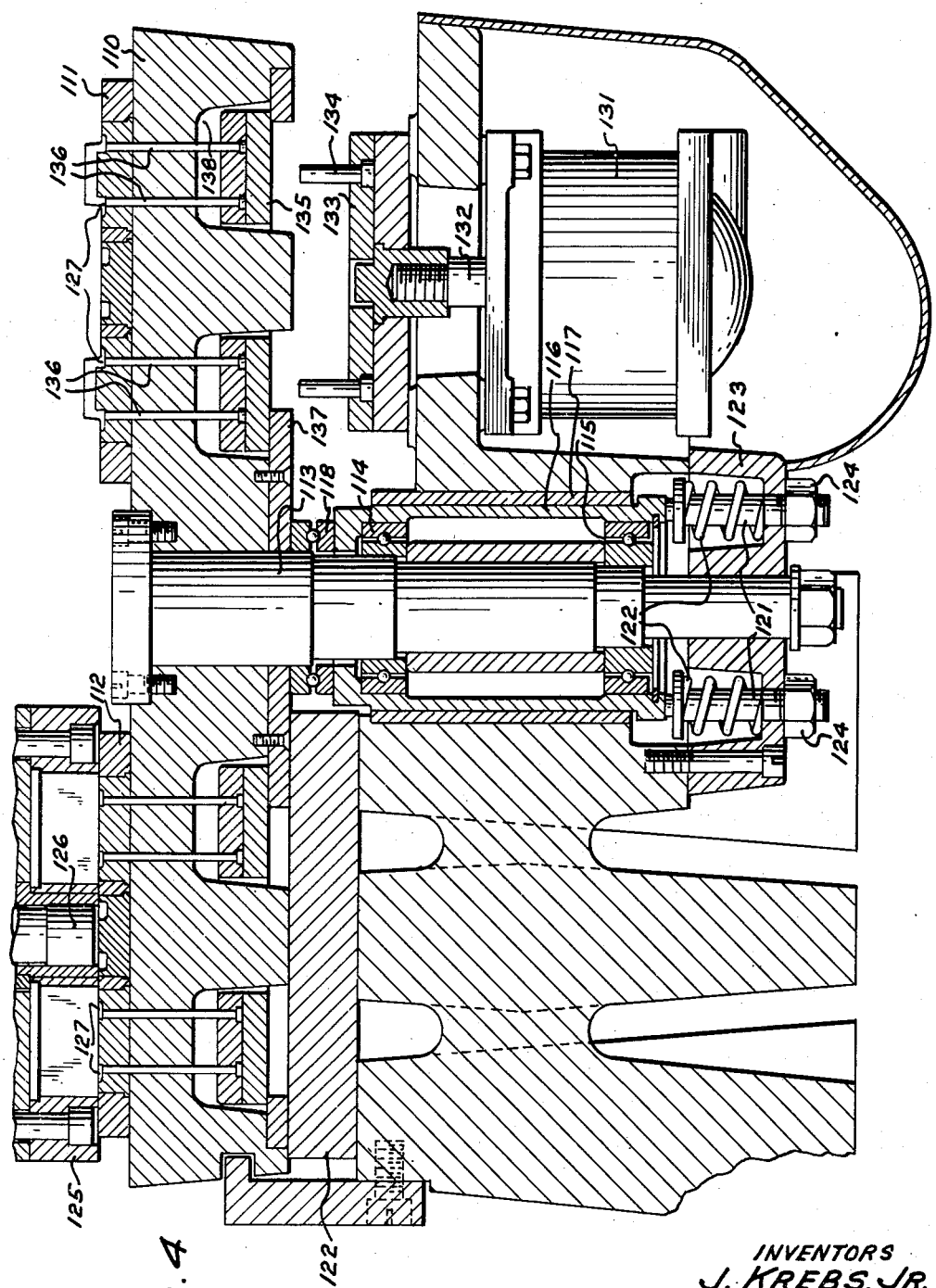

United States Patent Office 2,830,323
Patented Apr. 15, 1958

2,830,323
TURRET-TYPE MOLDING PRESSES

John Krebs, Jr., and Donald C. Morris, Indianapolis, Ind., assignors to Western Electric Company, Incorporated, New York, N. Y., a corporation of New York Application November 17, 1955, Serial No. 547,419

5 Claims. (Cl. 18—20)

This invention relates to turret-type molding presses, and has for an object thereof the provision of new and improved presses having turntables carrying molds alternately to molding positions and loading and unloading positions.

Another object of the invention is to provide a press having a turntable carrying molds from a loading position to a position between two platens and mounted resiliently to permit one platen to move the turntable against the other platen.

A further object of the invention is to provide a molding press having a turntable mounted on a resiliently mounted thrust bearing permitting one platen of the press to press the turntable against a second platen of the press without binding.

A molding press illustrating certain features of the invention may include a pair of relatively movable platens and means for moving one of the platens toward and away from the other platen. A turntable carrying a plurality of molds is mounted eccentrically of the press on a slidably mounted thrust bearing, which moves the turntable to a position between the molds when the press is opened so that the rotation of the turntable is not inhibited by contact with the press.

A complete understanding of the invention may be obtained from the following detailed description of presses forming specific embodiments thereof, when read in conjunction with the appended drawings, in which—

Fig. 1 is a top plan view of a portion of a press forming one embodiment of the invention;

Fig. 2 is a side elevation view, partially in section, of the apparatus shown in Fig. 1;

Fig. 3 is an enlarged vertical section taken along line 3—3 of Fig. 1, and

Fig. 4 is a fragmentary vertical section of a press forming an alternative embodiment of the invention.

Referring now in detail to the drawings, there is shown presses for transfer molding telephone parts, for example, fuse caps, receiver terminal plates, or the like. The press shown in Figs. 1, 2 and 3 includes a turntable or turret 10 carrying multi-cavity mold sections 11 and 12 having cores 13 and stripper plates 14. The turntable is rotatable between a position locating the section 11 over a knockout device 17 and the section 12 between an upper platen 18 and a stationary platen 19, and a position in which the sections 11 and 12 are reversed. Assuming the turntable to be in the position shown in the drawings, a valve 21 is actuated manually by a lever 22 to cause a cylinder 23 to move a piston 24 carrying knockout pins 25 upwardly, as viewed in Fig. 2, to move the stripper plate 14 of the mold section 11 upwardly to push the molded articles off the cores 13 so that the molded articles may be removed.

The press is then actuated to move the platen 18 downwardly toward the platen 19. The platen 18 carries an upper mold section 31 into engagement with the mold section 12, pushes the turntable downwardly against the platen 19, and moves a guard 32 mounted on a pair of spring-pressed levers 33 against the turntable. As the turntable is moved downwardly, springs 35 are compressed by a collar 36 supporting a thrust bearing 37 in an upwardly facing groove 38. The thrust bearing 37 supports the turntable, and the springs 35 normally urge the turntable to a position out of contact with the platen 19. The springs 35 are mounted in sockets 39 formed in a ring 40 threaded onto a fixed post 41 and locked in place by a lock nut 42. Headed screws 43 slidable in bores 44 limit upward movement of the collar 36. A screw 46 fitting in a bore 47 in the turntable mounts the turntable rotatably and retains the turntable on the bearing 37. Clearance is provided between a head 48 of the screw 46 and the bottom of a counterbore 49 in the turntable. The collar 36 is loosely slidable on a bearing portion 50 of the post 41.

Transfer molding of thermosetting material then is effected by a ram in the platen 18 in the usual manner to fill mold cavities 51 formed by the mold sections 12 and 31. Then the control switch is reversed to retract the platen 18, and knockout pins 61 push the molded parts out of the mold section 31. Also, the valve 21 is reversed, and the piston 24 is lowered. The springs 35 push the turntable up off the platen 19 during the initial portion of the opening movement of the platen 18. Then the operator swings a handlever 65 to turn a lever 66 in a counterclockwise direction, as viewed in Fig. 3, and a yoke portion 67 of the lever 66 pulls a spring-pressed locking pin 68 having a tapered end 69 out of a locking socket 70 in the turntable 10. The operator then swings the turntable 180°, and actuates the lever 65 to move the pin 68, which enters a socket 71 to lock the turntable in a precisely located position. If the pin does not enter the socket 71, a limit switch 72 is not actuated and blocks actuation of the press by the previously described control switch. If desired, the switch 72 may be used alone to control opening and closing movement of the press.

Embodiment shown in Fig. 4

A turntable 110 having lower molding sections 111 and 112 is fastened to a spindle 113 fastened to radial bearings 114 and 115 held by a sleeve 116 slidable in a fixed guide 117. The sleeve 116 supports a thrust bearing 118 which in turn supports the turntable 110, and is urged upwardly by pins 121 and springs 112 seated in a fixed plate 123. Nuts 124 on the pins 121 limit upward travel of the pins 121 to a position in which the turntable is lifted out of contact with a fixed lower platen 122 when an upper platen 125 is moved up to its open position. The upper platen 125 has a ram 126 associated therewith for pressing thermosetting material into mold cavities 127 by well known methods.

A knockout cylinder 131 and piston 132 are provided below the idle mold section position. The piston is designed to raise a knockout plate 133 and pins 134 into engagement with a knockout ring 135 carrying pins 136 and carried by a flange 137 of the turntable. The ring 135 is vertically movable in a groove 138 in the turntable.

The above-described presses are rapidly operated, and one mold section may be unloaded during a molding operation with the other mold section. Also, the turntables may be turned manually with little effort since the turntables are always clear of the lower platens.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a pressing apparatus including a vertical molding press having a stationary lower platen and an upper platen movable from an open position toward the lower platen, the combination therewith of a turntable, a thrust bearing supporting the turntable rotatably on a vertical axis offset laterally from the press, means mounting the bearing for vertical movement, and means radially offset from the axis of the mounting means for urging the bearing upwardly toward a normal position in which the turntable is held in a position above and out of contact with the lower platen and permitting the upper platen to move the turntable into engagement with the lower platen.

2. In a molding apparatus including a vertical molding press having a stationary lower platen and an upper platen movable from an open position toward the lower platen, the combination therewith of a turntable having a plurality of mold sections thereon, radial-and-thrust bearing means mounting the turntable rotatably on a vertical axis offset laterally from the press, means mounting the bearing means for vertical movement, and means radially offset from the axis of the mounting means for urging the bearing means upwardly toward a normal position in which the turntable is held in a position above and out of contact with the lower platen and permitting the upper platen to move the turntable into engagement with the lower platen.

3. In a molding apparatus including a press having a fixed lower abutment and an upper platen movable between an upper retracted position toward a lower operating position nearer the abutment, the combination therewith of a fixed vertical post offset laterally from the press, a turntable having a plurality of molding sections spaced therearound and being slidable and rotatable on the post, a thrust bearing mounted slidably on the upper end of the post, a collar secured to the post below the bearing, and spring means radially spaced about said vertical post positioned between the collar and the bearing for urging the bearing and turntable upwardly.

4. In a molding apparatus including a press having a fixed lower abutment and an upper platen movable between an upper retracted position toward a lower operating position nearer the abutment, the combination therewith of a guide fixed relative to the abutment having a vertical guideway offset laterally from the press, a sleeve mounted slidably in the guideway, a thrust bearing positioned on the top of the sleeve, radial bearings mounted in the sleeve, a turntable resting on the thrust bearing, a spindle fixed to the turntable and rotatable in the radial bearings, a plurality of pins engaging the bottom of the sleeve at points spaced therearound, and a plurality of compression springs urging the pins upwardly to urge the turntable through the sleeve and the thrust bearing to a position in which the turntable is above and out of contact with the abutment.

5. A molding press comprising a fixed platen, a movable platen mounted for reciprocation toward and away from said fixed platen, transfer molding means included in said movable platen, a turret interposed between said platens, bearing means mounting said turret for rotation about an axis offset from the axis of said platen, means for mounting said bearing for axial movement with the turret, a plurality of mold cavities formed on a surface of said turret facing said movable platen, and a plurality of resilient means radially spaced about the axis of said turret for axially urging said bearing means and said turret away from said fixed platen, said resilient means permitting the movable platen to push said turret into contact with said fixed platen.

References Cited in the file of this patent
UNITED STATES PATENTS

| 2,325,348 | Tucker | July 27, 1943 |

FOREIGN PATENTS

| 366,204 | Great Britain | Feb. 4, 1932 |